L. CONRAD.
AUTOMOBILE WHEEL.
APPLICATION FILED MAR. 11, 1910.
985,112.
Patented Feb. 21, 1911.
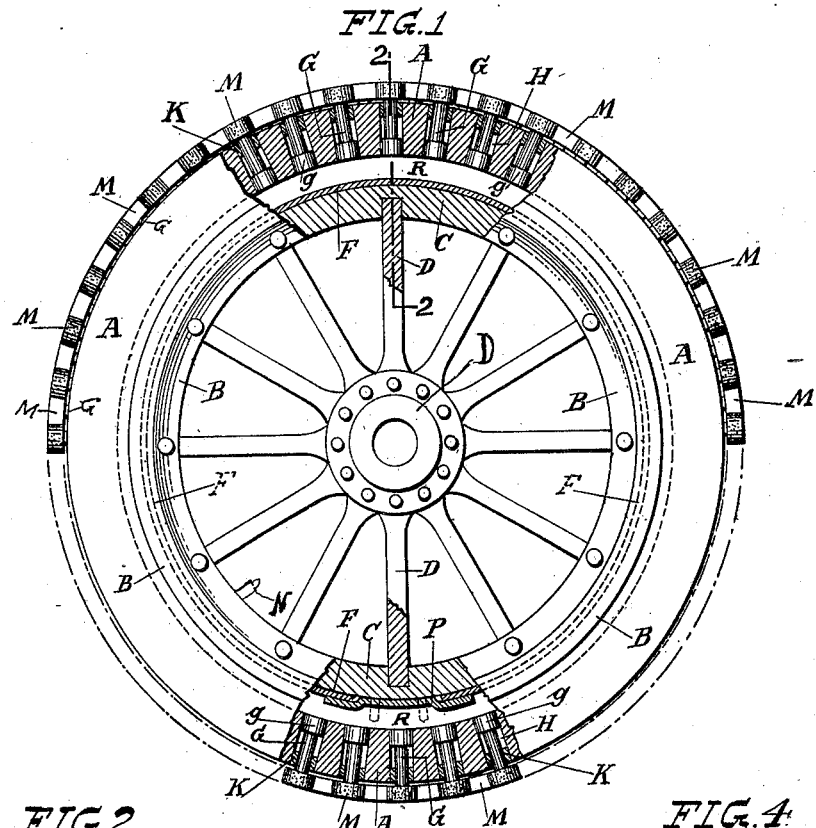
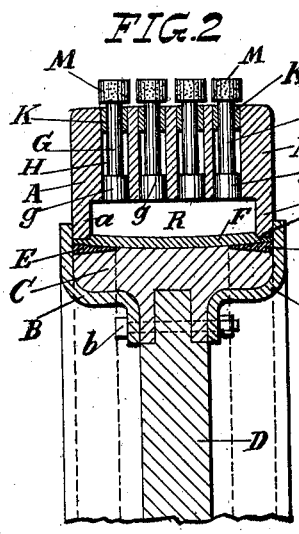
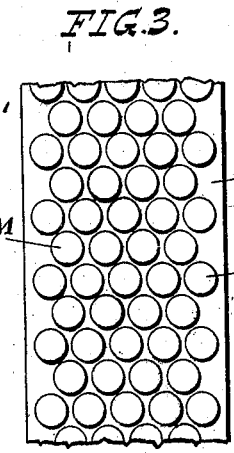
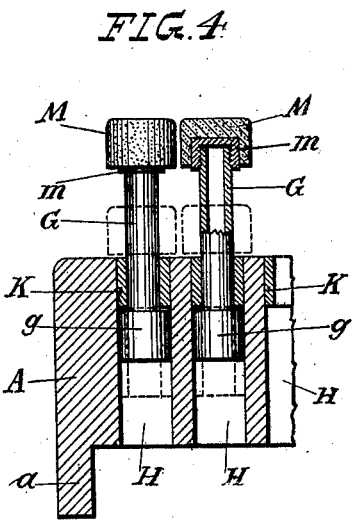
WITNESSES:
INVENTOR
Louis Conrad
BY Sigmund Honig
his ATTORNEY

UNITED STATES PATENT OFFICE.

LOUIS CONRAD, OF NEW YORK, N. Y.

AUTOMOBILE-WHEEL.

985,112.

Specification of Letters Patent. Patented Feb. 21, 1911.

Application filed March 11, 1910. Serial No. 548,692.

*To all whom it may concern:*

Be it known that I, LOUIS CONRAD, a citizen of the United States, and a resident of New York city, in the county of New York and State of New York, have invented certain new and useful Improvements in Automobile-Wheels, of which the following is a specification.

This invention relates to certain new and useful improvements in cushion wheels, and has for its main object the provision of novel and effective means for obtaining the desired cushion effect in automobile and like wheels without the aid of puncturable pneumatic tires.

A further object of my invention is to provide a wheel by means of which the same cushioning effect as is obtained by a pneumatic tire will be provided without the danger of punctures, and the longevity of which will materially exceed that of the ordinary pneumatic tire.

A still further object of my invention is to provide a wheel of this character which will be extremely simple in construction, and have no delicate parts or springs liable to become damaged or out of order and thus affect the proper working of the wheel.

With the above and other objects in view which will appear as the description proceeds and the invention is described in detail, the invention consists in the novel construction, combination and arrangement of parts as will hereinafter appear, and in describing the invention in detail, reference will be had to the accompanying drawings forming a part of this invention, and wherein like reference characters will be employed to designate like parts throughout the different views of the drawings, in which:

Figure 1 is an elevation of a wheel constructed in accordance with my invention, partially in section to better illustrate the detailed construction. Fig. 2 is a cross-sectional view of the wheel on the line 2—2 of Fig. 1. Fig. 3 is a plan view of a part of the tire of the wheel, and, Fig. 4 is an enlarged transverse vertical sectional view of a portion of the wheel tire.

The invention aims to provide a shock absorbing wheel not liable to puncture, and to put my invention into practice I provide a wheel rim A, preferably made of steel or other suitable metal, though obviously other material than metal may be employed. This wheel rim A surrounds the wheel body which comprises the felly C, spokes D, and hub D', together with the annular clamping rim members B which latter are secured to the felly C and spokes D as by bolts —b— extending therethrough.

On the felly C is a metal (preferably steel) ring F, the outer face of which is slightly concave and the inner face of which is slightly convex, as plainly seen in Fig. 2 of the drawings. This ring F has its ends received in the pockets provided by the offset ends of a plate P secured to the felly C, see Fig. 1. Wedges E are inserted between the walls of the felly C and the ring F to tighten the ring on the wheel, and these wedges are held in place by the tire securing members B. The ring F is provided at the opposite side edges thereof with annular seats F', see Fig. 2, for a purpose as will more fully hereinafter appear.

The rim or tire portion of the wheel as heretofore stated surrounds the body of the wheel, the body A being provided with channels H therethrough radially of the wheel and which at their inner ends communicate with an air chamber R which surrounds the annular ring F, and is formed by providing the rim A on its inner face with an annular recess of a width to leave annular flanges —a— at opposite sides of the rim A which seat in the recesses F', and the outer faces of which flanges are engaged by the securing members B, the flanges —a— being thus clamped between the shoulders on the ring F and the securing members B.

The channels H are separated from each other by partitions as is clearly apparent by reference to Figs. 2 to 4, and in the outer ends of the channels H is fitted gaskets K, which receive piston rods G, the pistons —g— of which neatly fit in an air-tight manner with the walls of the channels H. On the outer ends of the piston rods G are metal caps —m— provided with rubber tips or buttons M. Compressed air is introduced into the chamber R in the ordinary manner through a valve N which may be of the usual type, and mounted in the felly C in the usual manner.

The wheel and its tire having been constructed as above described, compressed air is introduced into the air chamber R. The pistons —g— will then be forced to the limit of their outward travel, that is, all of the pistons which are free from obstruction, at their outer ends, those resting on the surface being of course at the inward limit of their travel. As the wheel revolves, the pistons will be successively engaged around the periphery of the wheel and forced inwardly, their inward movement being resisted by the air pressure contained within the chamber R. Obviously, by this construction the same cushioning effect will be obtained as is obtained by a pneumatic tire. As the pistons pass out of engagement with the surface over which the wheel is traveling, they will be again forced outwardly to the limit of their travel so as to be in position to be again engaged as the wheel continues to revolve.

Besides obtaining the desired cushioning effect to the wheel of this construction, the treads of the pistons act to prevent slipping of the wheel as will be obvious, thus combining in the wheel the advantages of a pneumatic tire and tire armors or anti-slipping devices.

While the construction herein shown and described illustrates a preferred embodiment of my invention, it will be obvious that various changes may be made in the details of construction without departing from the spirit of the invention and the scope thereof as defined in the appended claim.

Having fully described my invention what I claim as new and desire to secure by Letters Patent is:—

A cushion wheel comprising a wheel felly, a ring contacting and surrounding said felly, a rim seated on said ring and having an annular recess on its inner face forming an air chamber surrounding the wheel, means for clamping the rim to the ring, annular wedges surrounding the wheel on opposite sides thereof and positioned between the ring and the felly in contact with the clamping means, said rim having radial channels communicating with the air chamber, pistons slidably mounted in said channels, gaskets fitted in the outer ends of the channels and flush with the outer periphery of the rim, tubular rods provided upon said pistons and extending through said gaskets and projecting beyond the periphery of the rim, the outer ends of said rods being screw-threaded, metal caps provided upon said rod ends and rubber coverings upon said caps.

Signed at New York city in the county of New York and State of New York this 17th day of February A. D. 1910.

LOUIS CONRAD.

Witnesses:
ISIDOR LIEBERSON,
ISIDORE M. SILBERMAN.